United States Patent [19]

Smith

[11] Patent Number: 4,733,113
[45] Date of Patent: Mar. 22, 1988

[54] WINDING FOR OPERATION OF A THREE-PHASE STEPPING MOTOR FROM A TWO-PHASE DRIVE

[75] Inventor: Robert C. Smith, Hartford, Conn.

[73] Assignee: The Superior Electric Company, Bristol, Conn.

[21] Appl. No.: 11,487

[22] Filed: Feb. 5, 1987

[51] Int. Cl.[4] ............................................. H02K 37/00
[52] U.S. Cl. ................................... 310/49 R; 318/696
[58] Field of Search ......................... 310/49, 184, 198; 318/696, 685

[56] References Cited

U.S. PATENT DOCUMENTS

| | | | |
|---|---|---|---|
| 3,117,268 | 1/1964 | Madsen | 310/49 X |
| 3,462,667 | 8/1969 | Jackson | 310/49 X |
| 3,473,059 | 10/1969 | Levin et al. | 310/49 |
| 3,509,392 | 4/1970 | Snowdon | 310/49 |
| 3,535,604 | 10/1970 | Madsen et al. | 310/49 |
| 3,621,312 | 11/1971 | Palmero | 310/49 |
| 3,866,104 | 2/1975 | Heine | 318/696 |
| 4,029,977 | 6/1977 | Chai et al. | 310/49 |
| 4,100,473 | 7/1978 | Lawrenson et al. | 318/696 |

Primary Examiner—Donovan F. Duggan
Attorney, Agent, or Firm—John H. Crozier

[57] ABSTRACT

A three-phase stepping motor having first, second, and third sets of stator poles, with the first and second sets of stator poles having single coils thereon and the third set having dual or bifilar coils thereon. The coils on the first set of stator poles and one of the coils on each pole of the third set of stator poles are connected to one phase of a two-phase drive. The coils on the second set of stator poles and the other of the coils on each pole of the third set of stator poles are connected to the other phase of a two-phase drive. The currents of the two drive phases are thus magnetically combined in the third set of stator poles to produce energization of the "third phase". In one embodiment, a twelve-pole, rotary, three-phase stepping motor with a 50-tooth rotor and a 48-, 50-, or 52-tooth-pitch stator produces a step angle of 1.8° mechanical with a two-phase drive.

11 Claims, 8 Drawing Figures

WINDING FOR OPERATION OF A THREE-PHASE STEPPING MOTOR FROM A TWO-PHASE DRIVE

BACKGROUND OF THE INVENTION

1. Field of the Invention

This invention relates to stepping motors, and more particularly to a winding for operating a three-phase stepping motor from a two-phase drive, such as to produce a step angle other than that which would normally be produced by the motor.

2. Background Art

As is well known, a stepping motor is a device which translates electrical pulses into mechanical movements by causing an output shaft to move a specific incremental distance or "step" for each pulse applied to the motor. As opposed to a conventional motor which has a free-running shaft, the stepping motor shaft moves in fixed, repeatable, known increments, resulting in the ability to accurately position. These motors are controlled by drive circuitry which provides the necessary number, sequence, and rate of pulses to achieve the desired extent of movement.

Stepping motors including synchronous inductor motors of the general type considered here have been described in detail elsewhere, as, for example, in U.S. Pat. No. 3,117,268. There, a rotary stepping motor has a permanent magnet moving member, or rotor, and a stationary member, or stator, comprising a plurality of poles with windings thereon for magnetizing the poles. Both the rotor and the stator have their magnetically coacting peripheries toothed and, when a unidirectional current is selectively applied to energize specific poles, the rotor can be made to rotate a predetermined increment (a "step"). Switching means in the drive circuitry are provided to continuously step the rotor in either direction in response to input control commands or to maintain the rotor at a hold, or stop, position which is the position to which it was last moved.

Very commonly, such a motor has eight stator poles and is a two-phase motor with four of the stator poles connected in one phase and the other four stator poles connected in the other phase, thus resulting in two identical phases with four magnetic poles each, typically referred to as a "four-pole" motor. This type of motor requires a two-phase drive for operation. Such a motor typically produces a mechanical stepping angle of 1.8°. This is determined as follows:

A stepping motor of the type under consideration here usually has 50 teeth around the periphery of the rotor and a stator tooth pitch of 48, 50, or 52 and the rotor is made to rotate in a chosen direction by the following four-step drive sequence, with "positive" and "negative" referring to the polarity of the current in the given phase:

|        | Phase 1 | Phase 2 |
|--------|---------|---------|
| Step 1 | +1      | +1      |
| Step 2 | +1      | −1      |
| Step 3 | −1      | −1      |
| Step 4 | −1      | +1      |

This sequence rotates the rotor an angular distance of one rotor tooth pitch. Thus, the step angle is equal to 360°/(50 rotor teeth)/(four steps) = 1.8° mechanical. Since the electrical field producing flux in the stator rotates through 360° for the movement of the rotor one tooth pitch, each step is equivalent to a 90° change in the electrical field.

It is well known that as the number of stator poles of a stepping motor is increased, there can be a corresponding increase in the torque produced by the motor and, also, smoother operation can be achieved. For the embodiment of the present invention described below, a twelve pole stator was selected. Considerations of commonality dictated that a 50-tooth rotor and a 48-, 50-, 52-, or variable-tooth-pitch stator be used; and, likewise, that the motor produce a step angle of 1.8° mechanical when operated with a two-phase drive, to accommodate existing two-phase drives and applications. Simply operating a twelve-pole stepping motor as a three-phase motor with a three-phase drive, would produce a step angle of 1.2° mechanical.

SUMMARY OF THE INVENTION

The present invention achieves operation of a three-phase stepping motor from a two-phase drive by winding the poles to produce three winding phases, such that the windings of two of the phases are connected individually to the two-phase drive, with the current of each of those phases passing individually through two coils wound on the poles of the third phase where the fluxes generated by the two currents are combined to produce the third phase energization. A four-step energization sequence effectively operates the motor as a "four-pole" motor. The two coils on the third phase poles may be discrete individual coils or they may be bifilar wound with the conductors of each coil wound parallel to each other.

While the present invention is described with reference to an embodiment employing a twelve-pole, hybrid, 50-tooth-rotor, 48-, 50-, or 52-tooth-pitch stator, rotary stepping motor to produce a 1.8° mechanical step angle, it will be understood by one skilled in the art that the teachings of the present invention can be applied as well to stepping motors having other numbers of stator poles, as well as to variable reluctance rotary stepping motors and to linear stepping motors of either the hybrid or variable reluctance type, with the same or with other step angles.

DESCRIPTION OF THE PREFERRED EMBODIMENT

Figure 1:
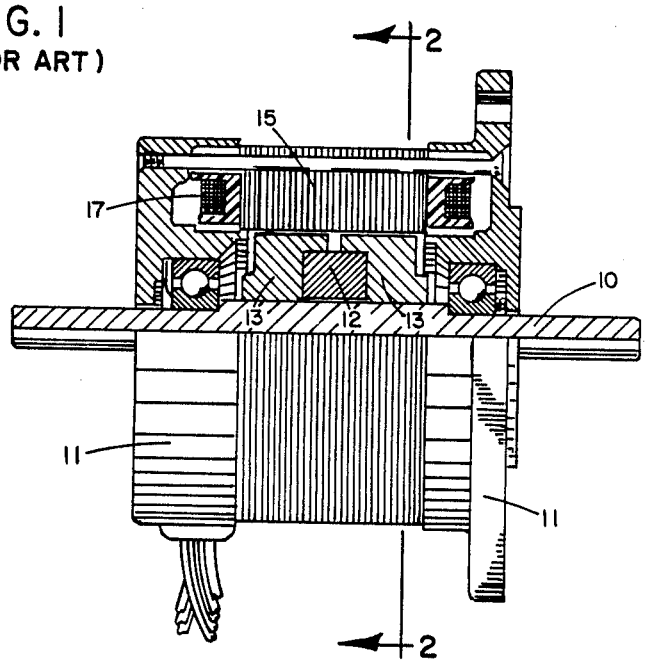
FIG. 1 is a side elevation, partly in section, of a typical conventional stepping motor.
Figure 2:
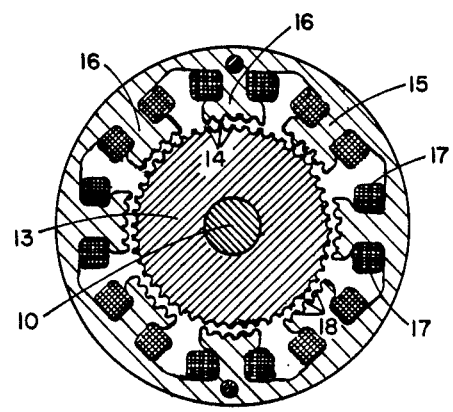
FIG. 2 is a view taken on the line 2—2 of FIG. 1.

Referring to the Drawing, FIGS. 1 and 2 show a typical conventional stepping motor which has a rotor comprising a rotatable shaft 10 projecting beyond generally cylindrical end bells 11. The shaft 10 has a cylindrical, axially-magnetized permanent magnet 12 secured on the shaft 10 with ferromagnetic pole pieces 13 secured on the shaft 10 at each end of the magnet 12. The peripheries of the pole pieces are toothed to provide a plurality of teeth, as at 14, with a total of 50 teeth equidistantly spaced around each periphery. The stator of the motor includes an annular ring 15 formed of laminated ferromagnetic material and fixedly positioned in the end bells 11 so that it is radially aligned around the rotor. The stator is formed, in the specific embodiment shown, to have eight poles 16, although the stator may have any number of poles which are multiples of two. Each pole 16 has a coil 17 associated therewith for magnetizing the pole according to the direction of electrical current in the coil. The pole pieces are formed to provide teeth as at 18 on their inner peripheries. As described above, a conventional stepping motor would typically be two-phase, with a 48-, 50-, 52-, or variable-tooth-pitch stator, and with the coils 17 on four of the poles 16 connected to form the winding of one phase and with the coils 17 on the other four poles 16 connected to form the winding of the other phase. Rotation of the rotor 10 is provided through the magnetic interaction, or flux linkage, of the rotor 10 and the poles 16 by changing the magnetization of the poles 16 according to the stepwise sequence described above. The sequence shown would produce rotation in one direction, while reversing the sequence would produce rotation in the opposite direction. A variable-tooth-pitch stator of the type noted above is described in U.S. Pat. No. 4,516,048 assigned to the assignee of the present invention.

Considering now a conventional twelve-pole, three-phase stepping motor with a three-phase drive, the electrical phase angle of the field in the stator and the current level in each winding phase of a particular motor may be indicated as follows:

| Electrical Phase Angle | Current | | |
|---|---|---|---|
| | Phase A | Phase C | Phase B |
| 0° | 0 | +.86 | +.86 |
| 30° | +.5 | +.5 | +1 |
| 60° | +.86 | 0 | +.86 |
| 90° | +1 | −.5 | +.5 |
| 120° | +.86 | −.86 | 0 |
| 150° | +.5 | −1 | −.5 |
| 180° | 0 | −.86 | −.86 |
| 210° | −.5 | −.5 | −1 |
| 240° | −.86 | 0 | −.86 |
| 270° | −1 | +.5 | −.5 |
| 300° | −.86 | +.86 | 0 |
| 330° | −.5 | +1 | +.5 |
| 360° | 0 | +.86 | +.86 |

It can be seen that the current values for phase angles of 30°, 120°, 210°, and 300° are equal in magnitude and these are repeated in the table below, for convenience in comparison, together with the four-step phase energization sequence which produces 90° electrical phase changes in a conventional stepping motor.

| Three-Phase Motor/Drive | | | | Two-Phase Motor/Drive | | |
|---|---|---|---|---|---|---|
| Electrical Phase Angle | Phase A | Phase C | Phase B | Electrical Phase Angle | Phase 1 | Phase 2 |
| 30° | +.5 | +.5 | +1 | 90° | +1 | +1 |
| 120° | +.86 | −.86 | 0 | 180° | +1 | −1 |
| 210° | −.5 | −.5 | −1 | 270° | −1 | −1 |
| 300° | −.86 | +.86 | 0 | 360° | −1 | +1 |

It can be seen that at each of the phase angles chosen for the three-phase motor/drive, which angles are 90° electrical apart, the current levels for Phase A and Phase C are equal in absolute magnitude and the polarities are the same as for the corresponding Phase 1 and Phase 2 current levels for the two-phase motor/drive. It can also be seen that Phase B is the sum of Phases A and C.

Therefore, if Phases A and C could be physically summed to provide Phase B, the three-phase motor could be operated from a two-phase drive with the following four-step sequence to produce a 1.8° step angle:

| | Phase A | Phase C | Phase B |
|---|---|---|---|
| Step 1 | +1 | +1 | +2 |
| Step 2 | +1 | −1 | 0 |
| Step 3 | −1 | −1 | −2 |
| Step 4 | −1 | +1 | 0 |

Since the Phase A and Phase C currents cannot conveniently be combined directly because of limitations of the drive, the present invention combines Phases A and C magnetically in the Phase B poles by passing the currents of Phases A and C through coils on the Phase B poles through the use of either dual windings or a bifilar winding on the Phase B poles. This produces a Phase B energization, in effect, as if Phase B had been wound as a separate phase and energized by a third drive phase, as shown in the table immediately above. The winding scheme is shown on FIG. 3 which is a cross-section of a stator, generally indicated by the reference numeral 20, wound according to the present invention. The stator 20 includes twelve poles as at 21 which are symmetrically and equally divided between three motor phases, A, B, and C, as indicated by the letters next to the pole faces. The poles indicated by the letters $\overline{A}$, $\overline{B}$, and $\overline{C}$ are included in Phases A, B, and C, respectively, and indicate opposite magnetic polarity. For example, when the A poles have a N magnetic polarity, the $\overline{A}$ poles will have a S magnetic polarity by virtue of the fact that the coils on the $\overline{A}$ poles are wound in the direction opposite that from the A poles. The A, $\overline{A}$B, and $\overline{B}$ poles have single coils and the C and $\overline{C}$ poles have either dual or bifilar coils. The winding of the coils is shown schematically on FIG. 3, with a conductor 22 from the Phase A output of a two-phase drive (not shown) wound about an A pole to produce with current flowing in one direction, say, a N magnetization of that pole with positive current. That conductor is then wound about the adjacent B pole to produce a N magnetization. Proceeding clockwise, that conductor is then wound in the opposite direction around the first $\overline{A}$ pole to produce a S magnetization of that pole. The conductor 22 is then wound about succeeding $\overline{B}$, A, B, $\overline{A}$, and $\overline{B}$ poles as shown to produce magnetization of those poles, respectively, of S, N, N, S, and S. A conductor 23 from the Phase C output of the two-phase drive is wound about the first B pole mentioned above in the same direction as conductor 22. When the current in conductor 23 is in the same direction as the current in conductor 22, the fluxes produced by the conductors in the B pole will be added; when the currents are in opposite directions, the fluxes will cancel. Proceeding clockwise, conductor 23 is then wound about the adjacent C pole and subsequent $\overline{B}$, $\overline{C}$, B, C, ',ovs/B/ , and $\overline{C}$ poles as shown. With a flow of positive current in conductor 23, magnetization of the poles in the order described will be N, N, S, S, N, N, S, and S.

It will be noted that there are shown twice as many turns on the B and $\overline{B}$ poles as on the other poles, which would produce twice as many ampere-turns on the B and $\overline{B}$ poles as on the others, and, thus, twice as much flux, when current flows in Phases A and C are either both positive or both negative. In practice, the conductors forming coils on the monofilar-wound poles may be of a smaller diameter than on those on the dual-coil or bifilar-wound poles, so that additional turns may be placed about the monofilar-wound poles, thus to provide equal ampere-turns on all poles.

Figure 3:
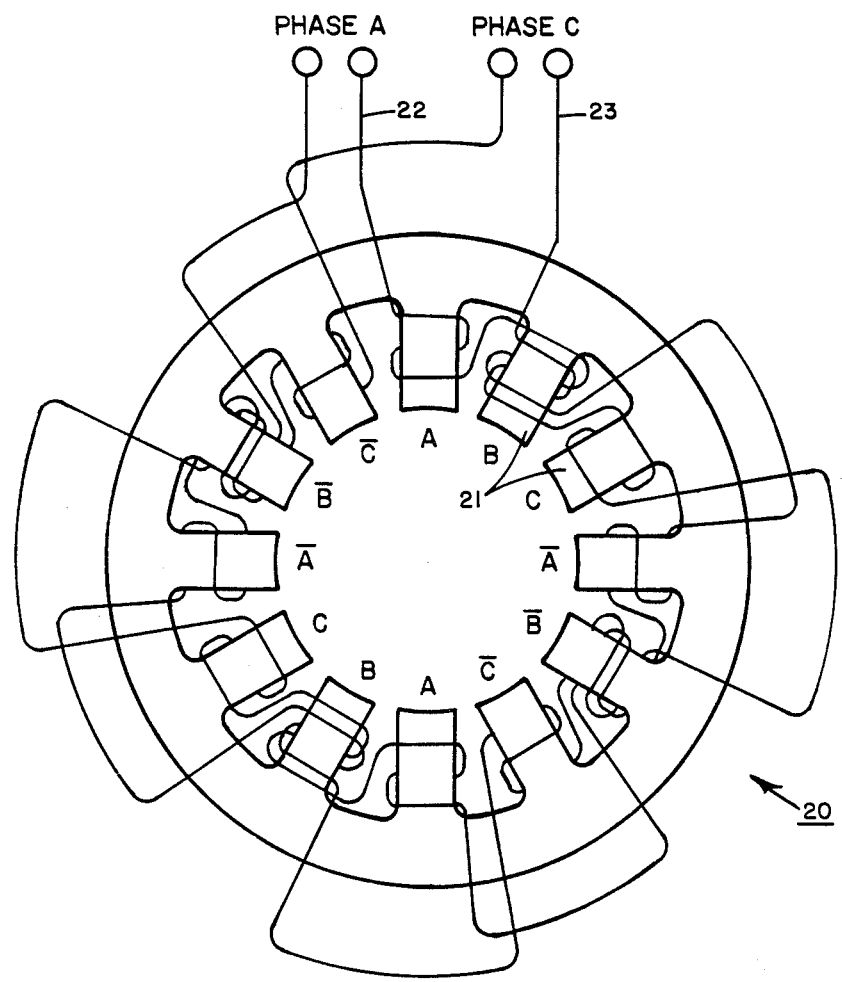
FIG. 3 is a cross section of a twelve-pole stator wound according to the present invention.

Although FIG. 3 shows the coils on the stator poles as serially connected to the drive, it will be understood that the coils may, as an alternate, be connected to the drive in parallel.

FIGS. 4(a) through 4(e) indicate the stepping action of a twelve-pole motor constructed according to the present invention. The figures show, in cross-section, a stator 30 and the S-magnetized end of a rotor 31 of a hybrid stepping motor. For greater clarity, the stator 30 is shown unwound and the rotor 31 is shown as having only 10 teeth; however, it will be understood that the principle of operation is the same as with a 50-tooth rotor, except that, in the case shown, a 9.0° step angle is produced. The poles of the stator 30 are related to Phases A through $\overline{C}$ in the same manner as shown on FIG. 3, as indicated by the reference letters around the perimeter of the stator. The polarities of the poles for a given energization are indicated by the letters N and S on the poles and the bold dashed orthogonal lines indicate the effective N and S poles of the stator as a whole. A "NN" on a Phase B pole indicates that both the A phase and the C phase are producing N magnetization of that pole, a "SS" on a Phase B pole indicates that both the A phase and the C phase are producing S magnetization of that pole, and an "O" on a Phase B pole indicates that Phase A and Phase C are producing cancelling flux in that pole.

Figure 4A:
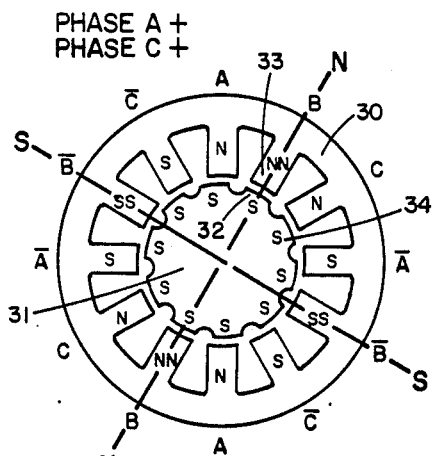
FIGS. 4(a) through 4(e) show the stepping sequence of a stepping motor constructed according to the present invention.
Figure 4B:
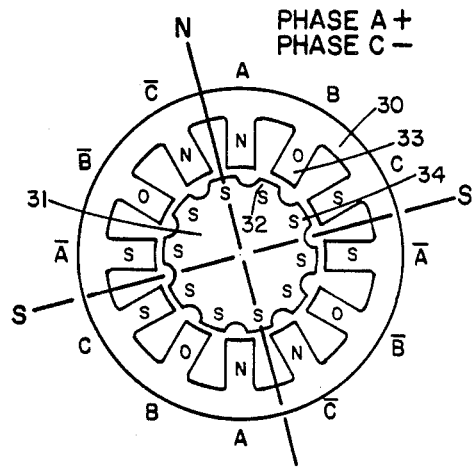
Figure 4C:
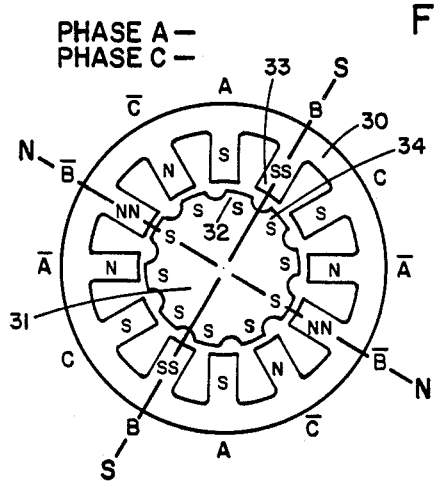
Figure 4D:
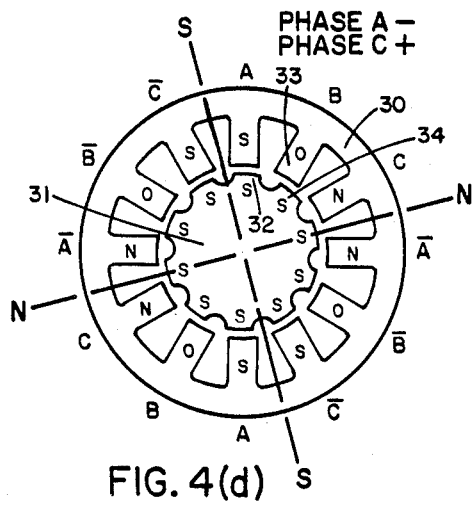
Figure 4E:
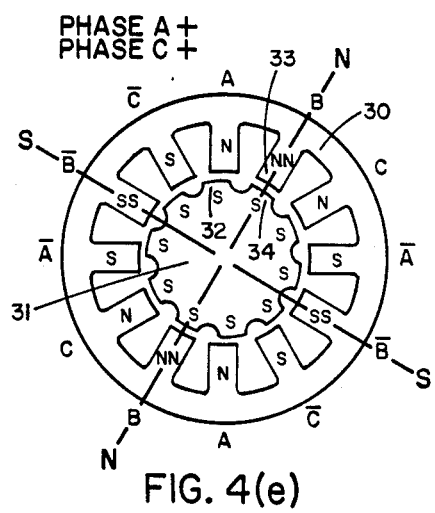

The first energization, FIG. 4(a), shows the polarities produced when Phases A and C are both positive. Here, for example, rotor tooth 32 is in full alignment with stator pole 33. With the first change in energization, FIG. 4(b), Phase A is positive and Phase C is negative, the field flux has rotated 90° counterclockwise, and rotor tooth 32 has moved one-quarter rotor tooth pitch counterclockwise. With the second change in energization, FIG. 4(c), the rotor has rotated one-half a rotor tooth pitch counterclockwise, and the third change in the energization sequence, FIG. 4(d), rotates the rotor another one-quarter tooth pitch. In the next change in energization, FIG. 4(e), Phases A and C are again both positive, as in FIG. 4(a), and rotor tooth 34 is now in full alignment with stator pole 33. Thus, the rotor has rotated four one-quarter rotor-tooth pitches, or one tooth pitch, as the polarity of the stator field has rotated in four 90° electrical increments: the same as a conventional two-phase, eight-pole stepping motor. If the phases are energized in the reverse sequence, the electrical field and, thus, the rotor will rotate in a clockwise direction.

The present invention has been described, for convenience, as applied to a three-phase stepping motor driven by a two-phase drive in a full-stepping mode with 90° electrical phase changes. While the three-phase motor will operate in this mode, it has been found that there is some torque ripple at the motor shaft. An inspection of the current levels in the three phases given in the table immediately above also shows that it is evident that this mode of operation will cause torque ripple. It has been found that, with the same motor winding configuration of the present invention and a two-phase drive, torque ripple is substantially attenuated when such a motor is operated in a microstepping mode with 60° electrical phase changes.

It will be understood that what has been disclosed is a novel winding for operating a three-phase stepping motor from a two-phase drive to produce a step angle other than that which would normally be produced by the motor.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

I claim:

1. A three-phase stepping motor adapted to be driven from a two-phase drive, comprising:
   (a) a moving member magnetically interacting with a stationary member;
   (b) the stationary member having first, second, and third sets of poles having thereon coils for magnetic energization thereof;
   (c) the poles of the fiist and second sets each having a single coil thereon;
   (d) the poles of the third set each having two coils thereon;
   (e) the coils on the first set of poles and one of the coils on each pole of the third set of poles being connected to one phase of the drive; and
   (f) the coils on the second set of poles and the other of the coils on each pole of the third set of poles being connected to the other phase of the drive.

2. A three-phase stepping motor adapted to be driven from a two-phase drive, comprising:
   (a) a moving member magnetically interacting with a stationary member;
   (b) the stationary member having n total poles, where n/6=an integer, comprising first, second, and third sets of equal numbers of poles having thereon coils for magnetic energization thereof;
   (c) the first and second sets having 2n/3 poles each;
   (d) the third set having n/3 poles;
   (e) the poles of the first and second sets each having a single coil thereon;
   (f) the poles of the third set each having two coils thereon;
   (g) the coils on the first set of poles and one of the coils on each pole of the third set of poles being connected to one phase of the drive; and
   (h) the coils on the second set of poles and the other of the coils on each pole of the third set of poles being connected to the other phase of the drive.

3. A three-phase stepping motor adapted to be driven by a two-phase drive, comprising:
   (a) a moving member magnetically interacting with a stationary member;
   (b) the stationary member having first through $n^{th}$ poles having thereon coils for magnetic energization thereof;
   (c) the first, third, fourth, sixth, seventh, ninth, tenth, ... and $n^{th}$ poles each having a single coil thereon;
   (d) the second, fifth, eighth, eleventh, ... and $(n^{th}-1)$ poles each having two coils thereon;

(e) the first, second, third, seventh, eighth, ninth, ... and ($n^{th}-3$) poles having the coils thereon wound in one direction;

(f) the fourth, fifth, sixth, tenth, eleventh, twelfth, ... and $n^{th}$ poles having the coils thereon wound in the opposite direction;

(g) the coil on the first pole, one of the coils on the second pole, the coil on the fourth pole, one of the coils on the fifth pole, the coil on the seventh pole, one of the coils on the eighth pole, the coil on the tenth pole, and one of the coils on the eleventh pole, ... and one of the coils on the ($n^{th}-1$) pole being connected to one phase of the drive; and (h) the other of the coils on the second pole, the coil on the third pole, the other of the coils on the fifth pole, the coil on the sixth pole, the other of the coils on the eighth pole, the coil on the ninth pole, the other of the coils on the eleventh pole, the coil on the twelfth pole, ... and the coil on the $n^{th}$ pole being connected to the other phase of the drive.

4. The motor as defined in claim 1, wherein: the moving and stationary members have toothed magnetically-interacting structures, such that when the drive phases are energized in the four-step sequence: positive/positive, positive/negative, negative/negative, negative/positive, the moving member will move one tooth pitch for each four-step change in energization.

5. The motor as defined in claim 2, wherein: the moving and stationary members have toothed magnetically-interacting structures, such that when the drive phases are energized in the four-step sequence: positive/positive, positive/negative, negative/negative, negative/positive, the moving member will move one tooth pitch for each four-step change in energization.

6. The motor as defined in claim 3, wherein: the moving and stationary members have toothed magnetically-interacting structures, such that when the drive phases are energized in the four-step sequence: positive/positive, positive/negative, negative/negative, negative/positive, the moving member will move one tooth pitch for each four-step change in energization.

7. A rotary, three-phase stepping motor adapted to be driven from a two-phase drive, comprising:

(a) a cylindrical rotor having longitudinal, equidistantly-spaced teeth around the periphery thereof;

(b) a stator having toothed poles radially disposed about the rotor, such that the teeth of the rotor and the teeth of the stator poles may magnetically interact to cause rotation of the rotor upon energization of the stator poles;

(c) the stator poles comprising first, second, and third sets of equal numbers of poles having thereon coils for magnetic energization thereof;

(d) the poles of the first and second sets each having a single coil thereon;

(e) the poles of the third set each having two coils thereon;

(f) the coils on the first set of poles and one of the coils on each pole of the third set of poles being connected to one phase of the drive; and (g) the coils on the second set of poles and the other of the coils on each pole of the third set of poles being serially connected to the other phase of the drive.

8. The stepping motor as defined in claim 7, wherein:

(a) the total number of stator poles is twelve;

(b) the coils, clockwise, on the first, second, third, seventh, eighth and ninth stator poles being wound in one direction;

(c) the coils, clockwise, on the fourth, fifth, sixth, tenth, eleventh, and twelfth stator poles being wound in the opposite direction;

(d) the first, third, fourth, sixth, seventh, ninth, tenth, and twelfth stator poles, clockwise, each having a single coil thereon;

(e) the second, fifth, eighth, and eleventh stator poles, clockwise, each having two coils thereon;

(f) the first set of stator poles comprises, clockwise, the first, fourth, seventh, and tenth stator poles;

(g) the second set of stator poles comprises, clockwise, the third, sixth, ninth and eleventh stator poles, and (h) the third set of stator poles comprises, clockwise, the second, fifth, eighth, and tenth stator poles.

9. The stepping motor as defined in claim 8, wherein:

(a) the rotor has 50 teeth;

(b) the stator has a 48-, 50-, or 52-tooth pitch; and (c) when the drive phases are energized in the four-step sequence: positive/positive, positive/negative, negative/negative, negative/positive, the rotor will rotate one tooth pitch for each four-step change in energization.

10. The motor as defined in claim 9, wherein the coils on each set of stator poles are connected in series to their respective drive phases.

11. The motor, as defined in claim 9, wherein the coils on each set of stator poles are connected in parallel to their respective drive phases.

* * * * *